Nov. 23, 1965  R. STARMER ETAL  3,219,552
PLURAL CONDENSING MEDIUMS FOR MULTI-STAGE FLASH EVAPORATOR
Filed Feb. 24, 1960  2 Sheets-Sheet 1

Inventors
Roy Starmer
James Ratcliffe Emmett
Stevens, Davis, Miller + Mosher  Attorneys Nov. 23, 1965     R. STARMER ETAL     3,219,552
PLURAL CONDENSING MEDIUMS FOR MULTI-STAGE FLASH EVAPORATOR
Filed Feb. 24, 1960     2 Sheets-Sheet 2
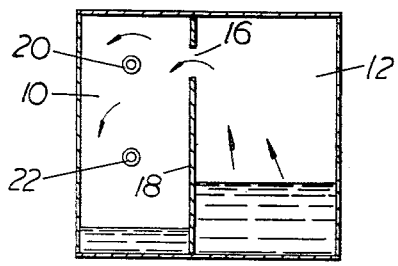
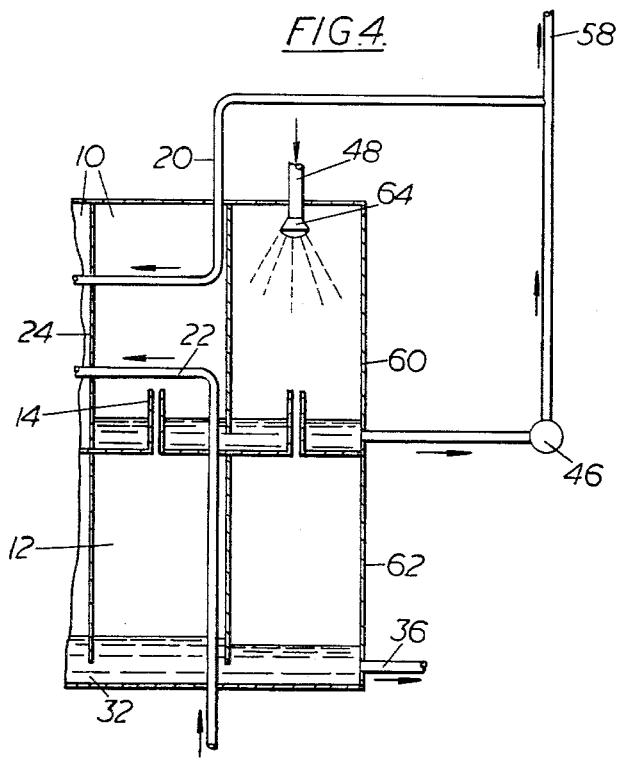

3,219,552
PLURAL CONDENSING MEDIUMS FOR MULTI-
STAGE FLASH EVAPORATOR
Roy Starmer, Cullercoates, Northumberland, and James
Ratcliffe Emmett, Ponteland, Newcastle-on-Tyne,
England, assignors to Richardsons, Westgarth & Co.
Limited, Northumberland, England
Filed Feb. 24, 1960, Ser. No. 10,583
Claims priority, application Great Britain, Feb. 27, 1959,
6,918/59
3 Claims. (Cl. 202—173)

This invention relates to flash-type evaporators and to methods of distilling a liquid and heating the resultant distillate in such evaporators.

Flash-type evaporators generally include at least one heater, a heat-input section and at least one flash chamber, the heater being provided with a tube or other means for conveying therethrough the liquid to be evaporated. After leaving the heater, or the last heater if a series of heaters are provided, the liquid is conveyed through the heat-input section in which it is heated further by a source of external heat, for example by steam generated in a boiler. The temperature to which the liquid is heated in the heat-input section must be such as to produce a temperature difference between the liquid in the heater and the liquid in the flash chamber, or in the last heater and the first flash chamber where a number of heaters and flash chambers are provided, which is sufficiently high for some of the liquid in the flash chamber to evaporate. The vapour thus produced in the flash chamber is passed into the heater and imparts its latent heat to the liquid in the tube, with the result that it is condensed and forms the liquid distillate required.

In those cases where the liquid to be distilled is sea water or brackish water and the resultant distillate is to be used as drinking water, the distillate is usually cooled in a so-called heat-rejection section which generally forms part of the evaporator and in which the distillate is cooled by any available cooling agent, for example, by liquid which is to be conveyed into the heater or the first heater. If, however, the distillate is intended to be used as boiler-feed water, or for any other industrial purpose calling for distilled water at or even above, the distillate-discharge temperature, a reduction in the temperature of the distillate would represent a waste of energy, although usually flash evaporators are designed to discharge the distillate at a temperature of the same order as that obtaining in the flash chamber or in the coolest flash chamber where a number are provided.

It is accordingly an aim of the present invention to ensure that the temperature of the distillate is increased to a point approaching the temperature required at its point of use without recourse to separate external heating means, and according to the invention a method of distilling a liquid by flash-evaporation comprises heating the liquid to flash-evaporation temperature, flashing off at least a part of the heated liquid, and using the vapour thus produced to heat further liquid to be evaporated and also vapour condensate already produced. The result is that the already-produced distillate and the further liquid to be evaporated are both heated by the vapour, while the vapour itself is condensed to form further distillate.

The invention extends to a flash-type evaporator for carrying out this method, and according to the invention the evaporator comprises a heater provided with two sets of liquid-conveying means, one set being arranged for the passage therethrough of liquid to be evaporated while the other set is arranged for the passage therethrough of vapour condensate, and a flash chamber which is connected to the heater in such a way that vapour produced in the flash chamber during operation of the evaporator is used to heat the liquid in both sets of liquid-conveying means in the heater.

It will be noted that the liquid-conveying means provided for heating the distillate in the heater also serve to condense flashed-off vapour. This dual function results in more distillate per unit area of heating surface being produced in addition to the economy obtained by the elimination of a separate distillate-heating vessel and all the interconnecting pipes and valves which that demands.

A number of examples of sea water or brackish water evaporators in accordance with the invention will now be described with reference to the accompanying drawings, in which:

FIGURE 3 is a vertical section illustrating a constructional variation; and

FIGURE 4 is a vertical section through a modification of the evaporator shown in FIGURE 2.

Figure 1:
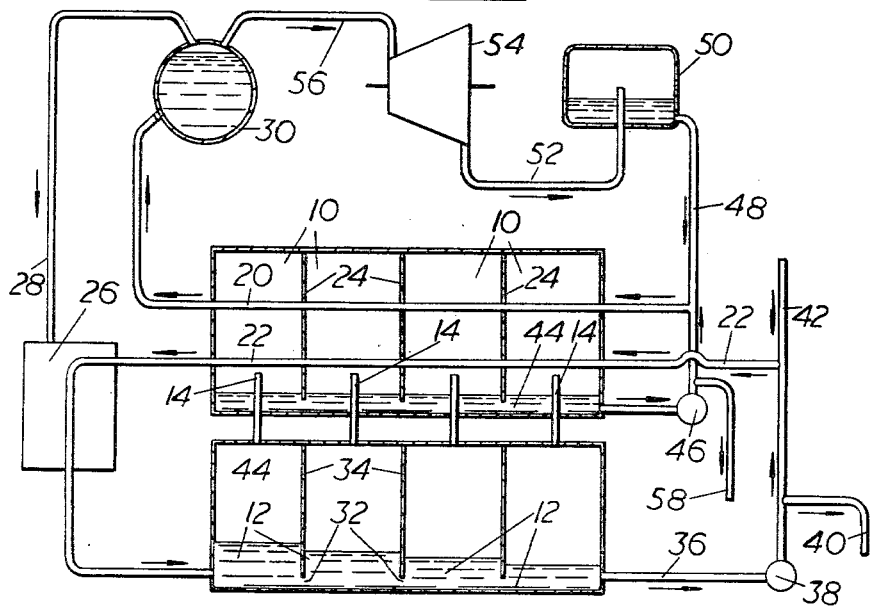
FIGURE 1 is a diagrammatic part-section view of one form of evaporator.

The evaporator shown in FIGURE 1 comprises a number of adjacent heaters 10 and a number of adjacent flash chambers 12, each flash chamber being associated with a heater and communicating therewith through a passage 14. Alternatively, each flash chamber can be arranged to communicate with its associated heater through a simple aperture 16 in an internal dividing wall 18 common to the associated heater and flash chamber as shown in FIGURE 3. The internal dividing wall 18 in FIGURE 3 lies in a vertical plane, but it may be arranged horizontally—depending on the arrangement of the heater relatively to the flash chamber. Two sets of liquid-conveying means are arranged in the heaters, and each set 20 and 22 consists of a single tube which extends between opposite end faces of the evaporator through an aperture or apertures provided in one or more partition walls 24 between adjacent heaters. Alternatively, each set may comprise a number of tubes extending between opposite end faces and providing for a number of parallel streams in each set. As a further alternative, each of the liquid-conveying means 20 and 22 in each heater may consist of a number of tubes arranged so as to provide a number of parallel streams. Each tube arranged for conveying a stream may consist of a number of tube units connected in series. In this case, the tubes, or the series-connected tube units, constituting the set 20 and the set 22 respectively are joined in series to the respective tubes or tube units in the adjacent heaters.

The tube or tubes 22 serve to convey liquid to be evaporated through the heaters 10 in the direction indicated by the arrows. The heated liquid then passes to a heat-input vessel 26 which receives steam as a heating medium through a tube 28 from a steam-boiler 30. On leaving the heat-input vessel 26, the liquid passes into the first one of the line of flash chambers 12 and passes from flash chamber to flash chamber through simple apertures 32 formed in internal partition walls 34 separating adjacent flash chambers. In each flash chamber some of the liquid is evaporated, and the vapour thus produced enters the heaters 10 through the passages 14 shown in FIGURE 1 or through the simple apertures 16 shown in FIGURE 3.

The liquid which remains unevaporated leaves the final flash chamber through a tube 36 and passes through a circulation pump 38. From here, part of the liquid is blown down to waste through a blow-down pipe 40, while the bulk is recirculated after fresh liquid, which enters the system through a pipe 42, has been added thereto in order to replace the distilled and discharged quantities.

The vapour which enters the heaters 10 from the flash chambers 12 gives up its heat to liquid passing through the tubes 20 and 22 and is thereby condensed. The condensate forms the distillate which it is desired to produce in the evaporator, and is cascaded from heater to heater through simple apertures 44 in the partition walls 24 separating adjacent heaters. The distillate is removed from the final heater by means of a distillate-extraction pump 46. Alternatively, the distillate may be extracted from each heater individually. Some of the distillate is mixed with condensate which enters the system through a pipe 48. This condensate is from an external source of supply which, in the particular case shown in FIGURE 1, comprises a condenser 50 arranged to condense spent steam passed into it through a pipe 52 from a steam turbine 54, the steam turbine itself being supplied with steam from the boiler 30 via a pipe 56.

The mixture of condensate from the condenser 50 and distillate from the heaters 10 is then passed through the tube or tubes 20 so that the mixture is heated by vapour from the flash chambers 12 before it enters the boiler 30 as feed water. That part of the distillate which is not required as boiler feed water is removed from the system through a pipe 58.

Figure 2:
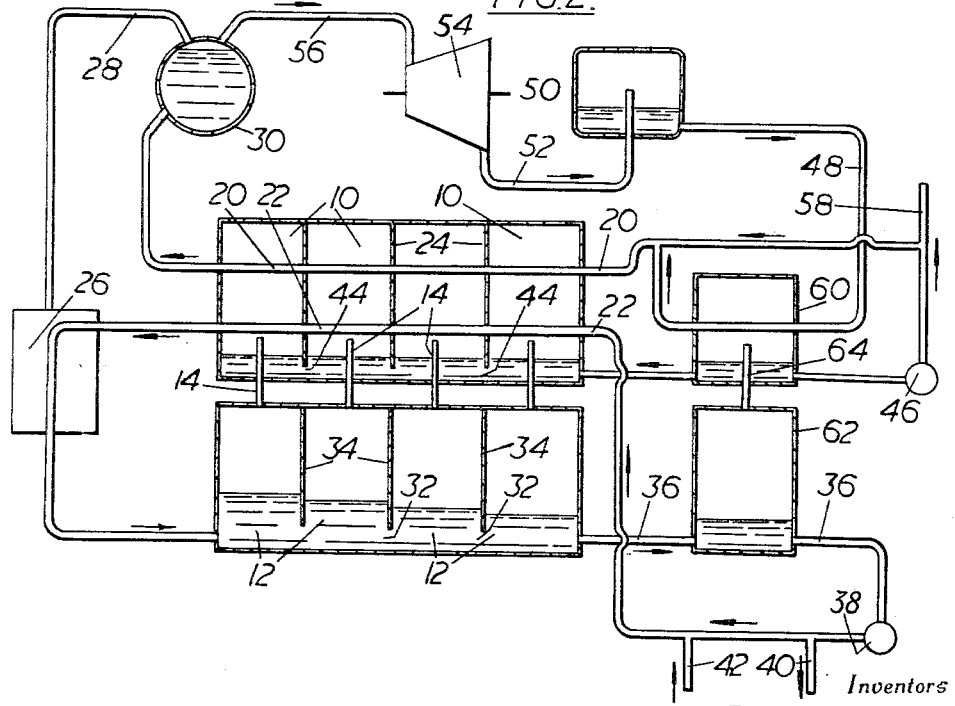
FIGURE 2 is a similar view of another evaporator.

If the temperature of the condensate from the condenser 50 or of another suitable liquid which it is intended to add to the distillate, is particularly low, it is advantageous for the condensate, prior to being added to the distillate, to be conveyed through a tube system arranged in a further vessel so that the condensate is preheated therein by vapour produced from unevaporated liquid conveyed from the last flash chamber to the said further vessel. Such an arrangement is shown in FIGURE 2 where the condensate from the condenser 50 is passed through a vessel 60 along the tube 48, the vessel 60 being arranged to receive flashed vapour from an extra flash chamber 62 through a passage 64. Alternatively, instead of conveying the condensate from the condenser 50 through the vessel 60, the condensate can be sprayed into the vessel 60 and be pre-heated therein by admixture with vapour produced in the extra flash chamber 62. This form of construction is shown in FIGURE 4 where the vessel 60 is provided with a spray nozzle 64. In addition, the vessel 60 forms a structural unit with the heaters 10 and the flash chambers 12.

The temperatures which prevail during operation of a typical evaporator constructed as shown in FIGURE 1 are given below by way of example.

° F.

Temperature of liquid in the tube 22 immediately before entry into the heaters 10 _____ 154
Temperature of liquid in the tube 22 immediately after leaving the heaters 10 _____ 218
Temperature of liquid immediately before entry into the flash chambers 12 _____ 230
Temperature of liquid immediately after leaving the flash chambers 12 _____ 160
Temperature of condensate in the tube 20 immediately after leaving the heaters 10 _____ 218

Typical temperatures for the apparatus shown in FIGURE 2 are as follows:

° F.

Temperature of liquid in the tube 22 immediately before entry into the heaters 10 _____ 154
Temperature of liquid in the tube 22 immediately after leaving the heaters 10 _____ 210
Temperature of heated liquid immediately before entry into the flash chambers 12 _____ 230
Temperature of liquid immediately after leaving the flash chambers 12 _____ 163
Temperature of condensate in the tube 48 immediately before entry into the vessel 60 _____ 120
Temperature of condensate in the tube 48 immediately after leaving the vessel 60 _____ 150
Temperature of condensate and distillate mixture in the tube 20 immediately before entry into the heaters 10 _____ 144
Temperature of condensate and distillate in the tube 20 immediately after leaving the heaters 10 ____ 210

It will thus be seen that, by means of the invention, the temperature of the boiler feed water is raised to a value closely approaching the temperature of the water within the boiler 30.

We claim:

1. A multi-stage flash type evaporator and distillate heater comprising a plurality of adjacent heater-condensers connected in series and a corresponding number of adjacent flash chambers each of which is communicatively connected with one of said heater-condensers, the flash chambers being connected in series with each other, a first liquid conveying system in each heater-condenser connected in series with the system in each of the adjacent heater-condensers and arranged for the passage therethrough of liquid to be evaporated and to be preheated therein by vapor produced in the associated flash chamber, means in each heater-condenser for collecting distillate produced as a result of the condensation of the vapor therein, distillate-withdrawing means connected to the heater-condensers, a second liquid conveying system extending through the heater-condensers, means to convey a portion of the distillate from the distillate-withdrawing means to said second system, whereby the distillate conveyed therethrough is heated by the vapor produced in the associated flash chambers to a temperature substantially higher than its temperature when withdrawn from the heater-condensers, and means for mixing said portion of the distillate with condensate originating from an external source of supply before passing said distillate portion into said second liquid-conveying system.

2. A multi-stage flash type evaporator and distillate heater comprising a plurality of adjacent heater-condensers connected in series and a corresponding number of adjacent flash chambers each of which is communicatively connected with one of said heater-condensers, the flash chambers being connected in series with each other, a first liquid conveying system in each heater-condenser connected in series with the system in each of the adjacent heater-condensers and arranged for the passage therethrough of liquid to be evaporated and to be preheated therein by vapor produced in the associated flash chamber, means in each heater-condenser for collecting distillate produced as a result of the condensation of the vapor therein, distillate-withdrawing means connected to the heater-condensers, a second liquid conveying system extending through the heater-condensers, means to convey a portion of the distillate from the distillate-withdrawing means to said second system, whereby the distillate conveyed therethrough is heated by the vapor produced in the associated flash chambers to a temperature substantially higher than its temperature when withdrawn from the heater-condensers, and means for mixing said portion of the distillate with condensate originating from an external source of supply before passing said distillate portion into said second liquid-conveying system, a further vessel comprising another heater-condenser and another associated flash space, said another heater-condenser connected to said series connected heater-condensers and arranged to receive distillate therefrom, said another flash space connected to said series connected flash spaces and receiving unevaporated liquid therefrom, a coolant conduit passing through said another heater-condenser, said coolant conduit being the only condensing means passing therethrough, said coolant conduit having one end in communication with said condensate from an external source, and its other end connected to said second liquid conveying means, prior to said distillate passing through said series connected heater-condensers, so said coolant conduit is disposed to first pass through said another heater-condenser before said condensate mixes with said distillate, whereby vapor produced in said another flash space is used to heat said condensate.

3. A multi-stage flash type evaporator and distillate heater comprising a plurality of adjacent heater-condensers connected in series and a corresponding number of adjacent flash chambers each of which is communicatively connected with one of said heater-condensers, the flash chambers being connected in series with each other, a first liquid conveying system in each heater-condenser connected in series with the system in each of the adjacent heater-condensers and arranged for the passage therethrough of liquid to be evaporated and to be preheated therein by vapor produced in the associated flash chamber, means in each heater-condenser for collecting distillate produced as a result of the condensation of the vapor therein, distillate-withdrawing means connected to the heater-condensers, a second liquid conveying system extending through the heater-condensers, means to convey a portion of the distillate from the distillate-withdrawing means to said second system, whereby the distillate conveyed therethrough is heated by the vapor produced in the associated flash chambers to a temperature substantially higher than its temperature when withdrawn from the heater-condensers, and means for mixing said portion of the distillate with condensate originating from an external source of supply before passing said distillate portion into said second liquid-conveying system said mixing means comprising a further vessel having another heater-condenser and another associated flash chamber, said another heater-condenser being connected to said series connected heater-condensers and arranged to receive distillate therefrom, said another flash chamber being connected to said series connected flash chambers and receiving unevaporated liquid therefrom, and a spray nozzle on said another heater-condenser for spraying condensate therein.

References Cited by the Examiner
UNITED STATES PATENTS

| | | | |
|---|---|---|---|
| 971,668 | 10/1910 | De Lany | 202—186 XR |
| 1,400,935 | 12/1921 | Brown | 202—202 XR |
| 1,509,634 | 9/1924 | Brown | 202—202 XR |
| 2,589,406 | 3/1952 | Latham | 202—75 |
| 2,759,882 | 8/1956 | Worthen et al. | 202—53 XR |
| 2,803,589 | 8/1957 | Thomas | 202—53 |
| 2,908,618 | 10/1959 | Bethon | 202—53 X |

FOREIGN PATENTS 815,796   7/1959   Great Britain.

OTHER REFERENCES

"Chemical Engineering," October 1956, page 126.

NORMAN YUDKOFF, *Primary Examiner.*

GEORGE D. MITCHELL, ALPHONSO D. SULLIVAN, JOSEPH B. SPENCER, *Examiners.*